US012589673B1

(12) United States Patent
Chandran et al.

(10) Patent No.: US 12,589,673 B1
(45) Date of Patent: Mar. 31, 2026

(54) ELECTRIC VEHICLE (EV) CHARGING SYSTEM

(71) Applicants: Deepak R Chandran, Monmouth JCT, NJ (US); Janaki D Chandran, Monmouth JCT, NJ (US)

(72) Inventors: Deepak R Chandran, Monmouth JCT, NJ (US); Sanath Kumar, Karkala (IN); Deepashri Sanath, Karkala (IN)

(73) Assignees: Deepak R Chandran, Monmouth JCT, NJ (US); Janaki D Chandran, Monmouth JCT, NJ (US)

( * ) Notice: Subject to any disclaimer, the term of this patent is extended or adjusted under 35 U.S.C. 154(b) by 0 days.

(21) Appl. No.: 19/397,148

(22) Filed: Nov. 21, 2025

(51) Int. Cl.
| | |
|---|---|
| *H02J 7/00* | (2026.01) |
| *B60L 53/65* | (2019.01) |
| *B60L 53/66* | (2019.01) |
| *B60L 53/67* | (2019.01) |
| *B60L 53/68* | (2019.01) |

(52) U.S. Cl.
CPC ............. *B60L 53/665* (2019.02); *B60L 53/65* (2019.02); *B60L 53/67* (2019.02); *B60L 53/68* (2019.02); *B60L 2270/32* (2013.01); *B60L 2270/38* (2013.01)

(58) Field of Classification Search
USPC ........................................................ 320/109
See application file for complete search history.

(56) References Cited

U.S. PATENT DOCUMENTS

| | | | | |
|---|---|---|---|---|
| 10,988,044 | B2 * | 4/2021 | Erb | G06Q 50/06 |
| 2024/0198839 | A1 * | 6/2024 | Wei | B60L 53/16 |
| 2025/0091468 | A1 * | 3/2025 | Kinsey | B60L 53/65 |

* cited by examiner

*Primary Examiner* — Samuel Berhanu
(74) *Attorney, Agent, or Firm* — Vani Moodley, Esq.

(57) ABSTRACT

The present invention relates to an electric vehicle (EV) charging system. The electric vehicle (EV) charging system includes an electric vehicle charger, a security monitoring module, a fleet management module, and a charging management platform. The electric vehicle charger is configured to supply power to a connected vehicle and a sensor interface unit (SIU) that enables user authentication through multi-modal biometrics such as voice, facial, fingerprint, RFID/NFC, license plate, and OTP verification, with a prioritised voice-based fallback. The security monitoring module continuously detects cable tampering, power anomalies, and unauthorised access, triggering real-time alerts. Further, a generative AI module analyses authentication, sensor, and network data to identify threats, correlate cyber and physical events, and generate adaptive responses. The fleet management module facilitates multi-level control with role-based authentication for super administrators, managers, and drivers. The charging management platform is provided for session validation, billing, and data recording.

20 Claims, 5 Drawing Sheets

ELECTRIC VEHICLE (EV) CHARGING SYSTEM

TECHNICAL FIELD

The present invention relates to a user interaction system for electric vehicle (EV) chargers or stations. More particularly, the present invention relates to an electric vehicle (EV) charging system for user interaction with multi-modal biometric authentication using voice, face, and/or fingerprint recognition.

BACKGROUND

Existing electric vehicle (EV) charging stations require manual interaction through physical controls, screens, or mobile applications to initiate and monitor charging processes. These physical interaction requirements can be challenging in situations of reduced visibility, adverse weather, or for individuals with mobility restrictions. To improve user convenience and experiences, there is a need for more accessible, hands-free alternatives that enable users to interact with charging stations effectively and securely.

Existing electric vehicle (EV) charging technologies also face challenges related to user authentication and security. Many charging stations rely on authentication methods such as mobile applications, QR codes, RFID cards, or personal identification numbers (PINs). However, these methods are prone to security vulnerabilities. RFID cards, in particular, can be easily duplicated or cloned by malicious actors, which can result in unauthorized access to charging stations, particularly in public or communal areas. Moreover, the reliance on physical cards or applications can pose inconvenience, and there's a risk of users forgetting or misplacing them, resulting in delays and frustrations. As the adoption of electric vehicles (EVs) increases, ensuring secure and user-friendly access to charging stations is crucial to prevent misuse and unauthorized use.

Currently, fleet users face significant challenges due to the nature of fleet operations, which involve multiple vehicles and multiple drivers. In such scenarios, it may not be practically possible for every driver to authenticate and register individually, especially when drivers may be hired on a temporary basis, or fleet operators use vehicles with drivers provided by a hiring agency. This creates additional complications in managing access to charging stations, as each driver would need to authenticate themselves separately, leading to inefficiencies and delays in the charging process.

The present invention introduces an almost near hands-free, or handsfree interaction system for EV chargers or stations that prioritizes convenience and security. The system enables users to control charging stations using voice commands, with voice recognition serving as the primary authentication method. In rare cases where voice recognition may fail due to various factors such as illness (e.g., having a severe cold/tracheal infections) or due to extreme external environmental noise, the system employs multi-modal biometric authentication, utilizing facial recognition and/or fingerprint recognition as secondary method. The above mode of verification is also configurable to employ two-factor authentication (2FA) methods for increased security at every instance.

If all of the above three biometric authentication methods fail, the system provides an additional layer of security by sending a One-Time Password (OTP) to the user's registered cellular phone number. The user can then either enter this OTP on the terminal display or dictate it through voice input, ensuring secure access under any circumstances. Another security mechanism that the EV Charger system can adapt is to shut down itself thereby preventing any access to any users for EV Charging. This ensures the maximum security for user's secure EV Charging operation.

For fleets, the system handles secure fleet authentication, allowing drivers to authenticate using OTP verification.

This innovative system not only enhances security but also offers a highly personalized and user-friendly experience. By recognizing users through their voice, face, and/or fingerprint profiles, the system can recall preferences, tailor charging options, and provide updates in the user's preferred language. This multi-layered approach reduces reliance on physical objects like RFID cards or touch interfaces, ensuring a seamless and secure charging process.

Therefore, there is a need for an electric vehicle (EV) charging system to overcome a few or all drawbacks of the existing technologies.

STATEMENT OF THE INVENTION

An object of the present invention is to provide an electric vehicle (EV) charging system of a secure multi-modal authentication-based voice interaction for all types of chargers or stations, including networked AC & DC fast chargers (DCFC).

Another object of the present invention is to provide an electric vehicle (EV) charging system that is a primarily hands-free user interaction system for EV chargers or stations that enables users to initiate, monitor, and manage charging sessions using voice commands, minimizing the need for physical touch or manual input.

Another object of the present invention is to primarily integrate multi-modal authentication methods, such as voice recognition as the primary authentication method and facial or fingerprint recognition as secondary methods, with an OTP fallback mechanism to ensure secure access even in challenging conditions.

Yet another object of the present invention is to provide live support chat, monitoring network authentication attacks, using Generative AI-powered algorithms, and chatbots for resolving authentication errors or technical issues, and one-touch access to human customer service agents or AI generative agents, all accessible through voice interaction for seamless and immediate assistance.

Yet another object of the present invention is to utilize Generative AI-powered algorithms for network monitoring to detect and mitigate potential cyber-attacks, including credential spoofing and other related methods aimed at stealing user credentials, network data, charger access information, or other sensitive assets.

Yet another object of the present invention is to provide a secure and efficient authentication system for fleet operations, enabling centralized management of multiple drivers and vehicles.

Yet another objective of the present invention is to provide a security alert mechanism for specific instances, such as the cutting of the charging cable or disconnection of the input power cable, whether in an idle state or during active charging. This mechanism features a self-annunciating system designed to deter unauthorized actions, triggering alerts if an attempt to cut power or disconnect cables is detected. Additionally, the EV chargers serve as duress terminals, capable of sending out emergency alerts or calling for assistance in case of security breaches or other emergency situations.

Yet another object of the present invention is to provide a fail-safe security mechanism that ensures continuous monitoring and protection of the EV charging station. This mechanism employs both a passive fail-safe approach and a hardwired redundant configuration.

Yet another object of the present invention is to reduce or eliminate dependence on physical objects like RFID cards, access keys and touch-based interfaces, thus making the charging process more intuitive, accessible, near touchless and secure for all users, including those with physical disabilities or hands-free requirements.

Yet another object of the present invention is to provide real-time feedback to users through voice prompts, visual displays, or mobile notifications, offering status updates, error alerts, and guidance throughout the charging process to enhance user experience and operational transparency.

Yet another object of the present invention is to provide seamless integration with various Charge Management Systems (CMS) using industry-standard protocols such as the Open Charge Point Protocol (OCPP), ensuring interoperability and efficient communication with backend systems for remote monitoring, billing, and operational control.

According to the present invention, an electric vehicle (EV) charging system is provided. The electric vehicle (EV) charging system is designed to provide secure, intelligent, and multimodal authentication-based operation. The system comprises multiple integrated modules working together to ensure efficient charging management, enhanced safety, and advanced cyber-physical protection.

The system includes an electric vehicle charger configured to supply electrical energy to a connected EV through a charging cable.

Further, the electric vehicle (EV) charging system includes a sensor interface unit (SIU) that performs local sensing and user interaction, a generative AI module for analyzing authentication, sensor, and network data to detect threats and generate adaptive, context-aware security and control responses, a fleet management module that provides hierarchical access control and session association, and a charging management platform that validates credentials, initiates and monitors charging sessions, records usage data and billing events, and stores preferences.

The sensor interface unit (SIU) has at least one processor and a memory configured to receive user authentication data through one or more of voice, facial recognition, fingerprint, RFID/NFC tag, license plate, or mobile number-based one-time password (OTP). The SIU is configured to authenticate the user using a multi-modal biometric and contextual matching with a fallback sequence prioritizing voice authentication, and to enable voice-based control of charging and security operations.

The security monitoring module is integrated within the SIU, including the power delivery unit. This module is configured to monitor cable integrity and power connections for tampering or anomalies, receive authentication state data from the SIU, and trigger alerts through visual, audio, and encrypted remote notifications upon detection of inconsistent user or cable states.

The generative AI module is integrated with the SIU and is configured to communicate with the security monitoring module of the SIU through the charging management platform. The generative AI module is configured to analyse authentication, sensor, and network data for physical and cyber threats, synthesise adaptive security responses, personalised user feedback, and generate context-specific control signals to adjust charging session parameters or invoke duress protocols.

The system also includes a fleet management module operatively coupled to the generative AI module. The fleet management module is configured to register fleets and assign hierarchical user roles, including super administrator, manager, and driver. The fleet management module supports temporary driver authentication using OTP and associates each charging session to a corresponding vehicle and driver profile.

The charging management platform is provided to validate credentials from the SIU, initiate and monitor charging sessions responsive to AI and security inputs, and record usage data, billing, and preferences. The system provides continuous charging operation, including duress detection, personalized user feedback, autonomous vehicle authentication, and AI-based cyber-physical threat response.

The sensor interface unit (SIU) comprises a microphone array configured for directional audio capture with ambient noise suppression and a voice processing module implementing natural-language-processing (NLP) and natural language understanding (NLU) executed by the processor of the SIU. The voice processing module is operable at ambient noise levels up to 85 decibels. The SIU implements a multi-modal authentication method with a sequential fallback mechanism in which authentication is attempted first through voice recognition, followed by facial recognition, then fingerprint recognition, and finally by one-time password (OTP) verification. The sensor interface unit (SIU) also supports parallel biometric authentication requiring two or more biometric factors for high-security modes and configurable authentication levels determined by the charging management platform or a fleet policy based on at least one of transaction value, user preference, or security policy.

The system further includes a proximity sensor configured to detect the presence of an approaching vehicle and publish a presence event to the SIU, a license plate recognition (LPR) camera communicatively coupled to the SIU and configured to perform pre-authentication based on a registered vehicle identity, and a lost user credentials retrieval module operable when biometric authentication fails. The SIU is further configured for duress detection by recognising a user-defined duress phrase via a voice processing module and causing the generative AI module to trigger a silent alarm, transmit a real-time geographic location to designated emergency response services, and maintain normal operation of a user interface to avoid alerting the potential threat actor.

The security monitoring module comprises electrical resistance measurement circuitry configured to detect cuts or breaches in the charging cable, a current-sensing circuitry configured to detect anomalies in power delivery from the power delivery unit, and comparative logic circuitry configured to identify resistance deviations exceeding a predefined threshold value indicative of tampering. The security monitoring module further comprises input-power sensing circuitry configured to detect unauthorised disconnection events and a state-logic controller configured to differentiate between authorised maintenance operations and tampering attempts using at least one maintenance authorisation token or a service mode command received from the charging management platform. The security monitoring module also includes a fail-safe architecture comprising a primary processing unit and a secondary processing unit operating in redundancy, a secured boot partition configured to retain core security functionalities during fault conditions, and automatic failover logic configured to monitor and continue event logging upon a processor failure.

Additionally, the security monitoring module comprises a machine-learning module trained on historical tampering and fault datasets, a dynamic-threshold adjustment engine that adapts resistance and current thresholds to environmental variables, including temperature and cable length, and a pattern recognition engine configured to reduce the occurrence of false positive security alerts. The security monitoring module also comprises a GPS-based location-reporting module configured to attach a geotag to tamper alerts, integration interfaces for communication with law enforcement or third-party security databases according to a station policy, and video-capture triggers that command a camera to record upon detection of tampering or unauthorized access.

The fleet management module comprises a fleet registration module configured to assign unique fleet identifiers and establish hierarchical user roles, including super administrator, manager, and driver. The fleet management module also includes a session tracking module configured to associate each charging session with a specific vehicle identifier and a driver identity under the fleet account. The super administrator is authorized to perform billing operations, fleet creation, and user management. The manager is authorized to assign drivers and register fleet vehicles, and the driver is restricted to initiating charging sessions and viewing session status information.

The fleet management module further includes a driver authentication submodule configured to issue time-limited OTP credentials to drivers, enforce geofencing restrictions that limit session initiation to designated station locations, and generate automated alerts to managers upon driver profile changes or access attempts outside geofenced boundaries, the alerts being prioritized using a risk score provided by the generative AI module. The fleet management module also includes a fleet card management module configured to issue physical or virtual authentication cards linked to the fleet identifier, an autonomous vehicle support module configured to authenticate a vehicle using an embedded RFID or NFC tag without driver input, and a charging schedule optimization module utilizing AI-generated utilization forecasts to allocate session times or power limits across the fleet via the charging management platform.

The generative AI module comprises a continuous-monitoring engine configured to analyze user authentication attempts, network communication patterns, and physical sensor inputs from the security monitoring module across multiple charging stations, and a credential-protection module configured to detect credential spoofing attempts and man-in-the-middle attacks affecting authentication or payment data, and to command the SIU to escalate authentication requirements.

The generative AI module also comprises a natural-language-processing engine to interpret user voice inputs provided by the SIU, a deep-learning model trained on historical cyberattack and intrusion data, and a reinforcement-learning engine configured to adjust threat-response policies over time based on observed outcomes. The generative AI module further includes a user-behaviour profiling module configured to generate baseline interaction patterns for each registered user; a risk-scoring engine configured to detect deviations from the baseline and publish a risk score to the SIU, and the fleet management module through the charging management platform.

The generative AI module also includes an automated response module configured to implement escalation protocols ranging from user warnings to account lockouts, initiate multi-factor authentication upon detection of suspicious login behaviour, and coordinate with the security monitoring module to perform integrated physical and cyber threat mitigation, including temporarily suspending the power delivery unit. The system further includes a deception framework comprising one or more honeypot charging ports configured to attract unauthorised actors, a decoy-data generation module configured to present non-operational session data to unauthorised users, and an automated incident-reporting module configured to notify designated security authorities with AI-generated summaries.

The generative AI module includes a blockchain-integrated event logging module configured to append tamper and security events to an immutable audit trail, a federated-learning framework configured to share threat intelligence across stations without transmitting user-identifying data, and a post-quantum cryptography module configured to store credentials and audit logs using a quantum-resistant key-establishment or signature scheme.

BRIEF DESCRIPTION OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure.

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label, irrespective of the second reference label.

Figure 1:
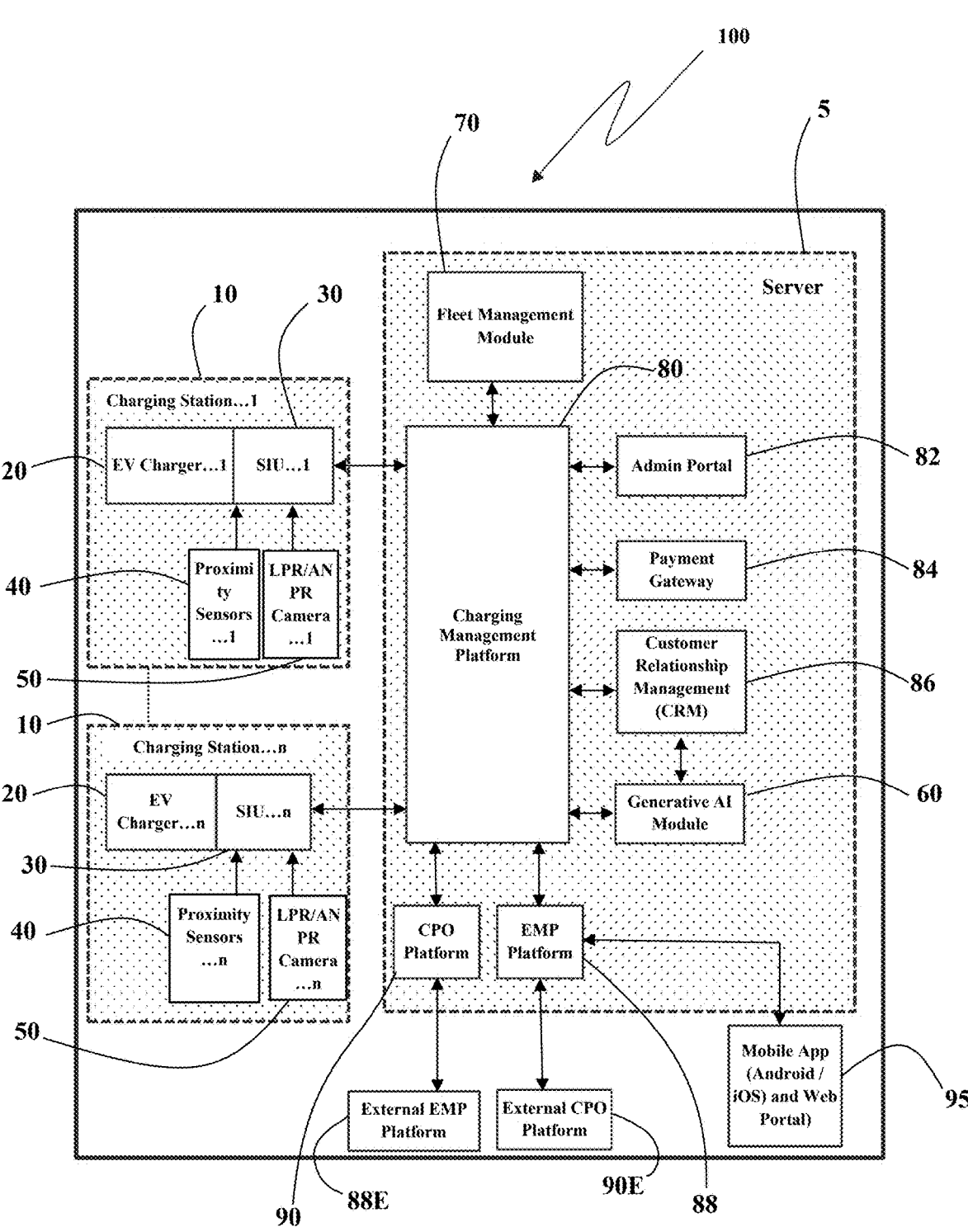
Figure 2:
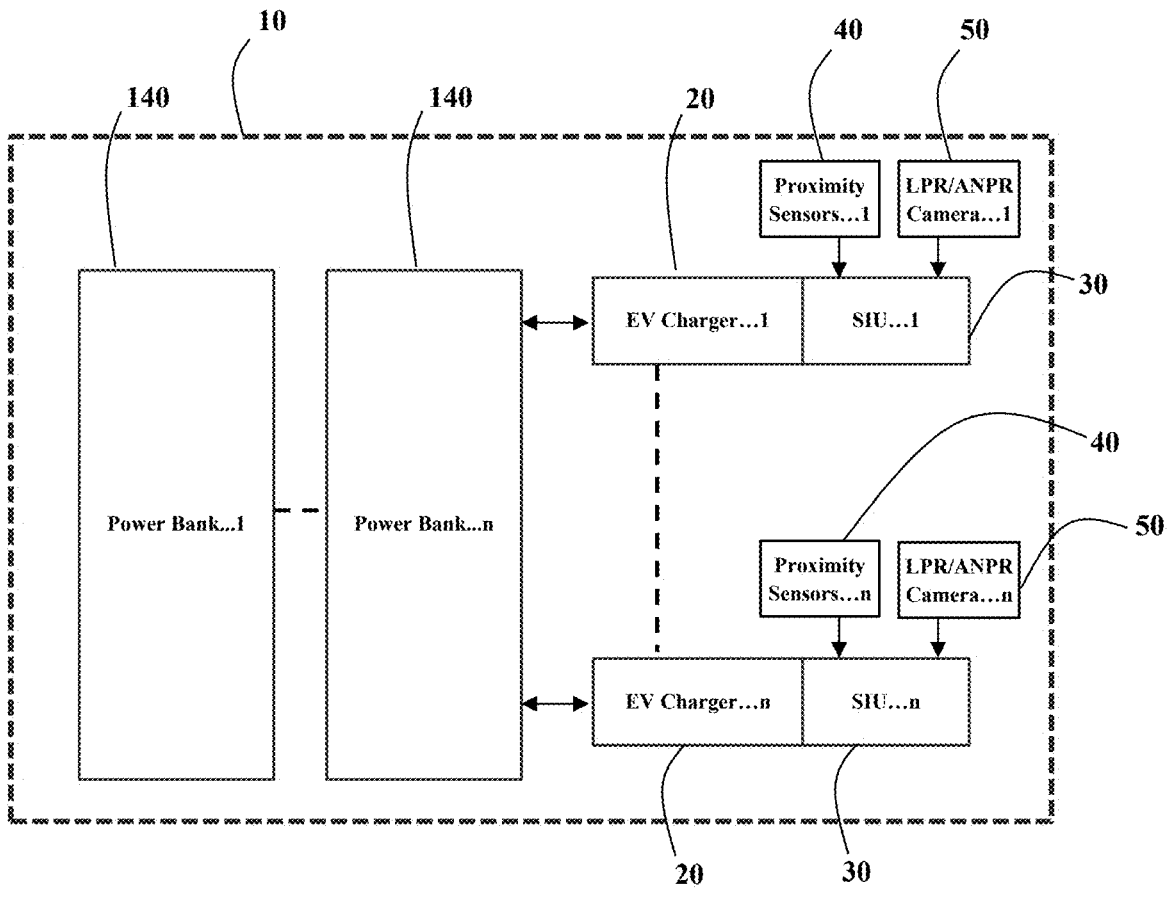
Figure 3:
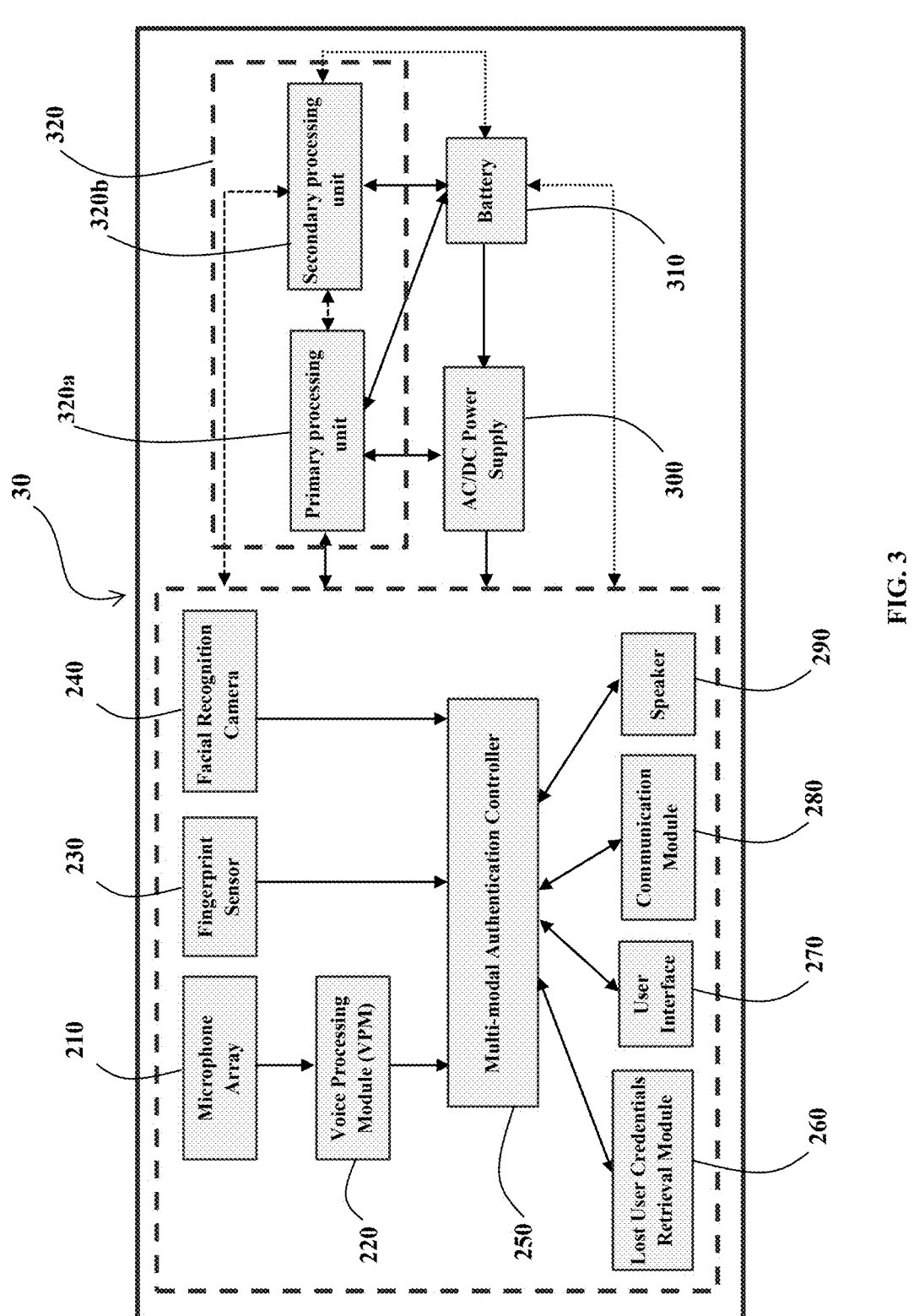
Figure 4:
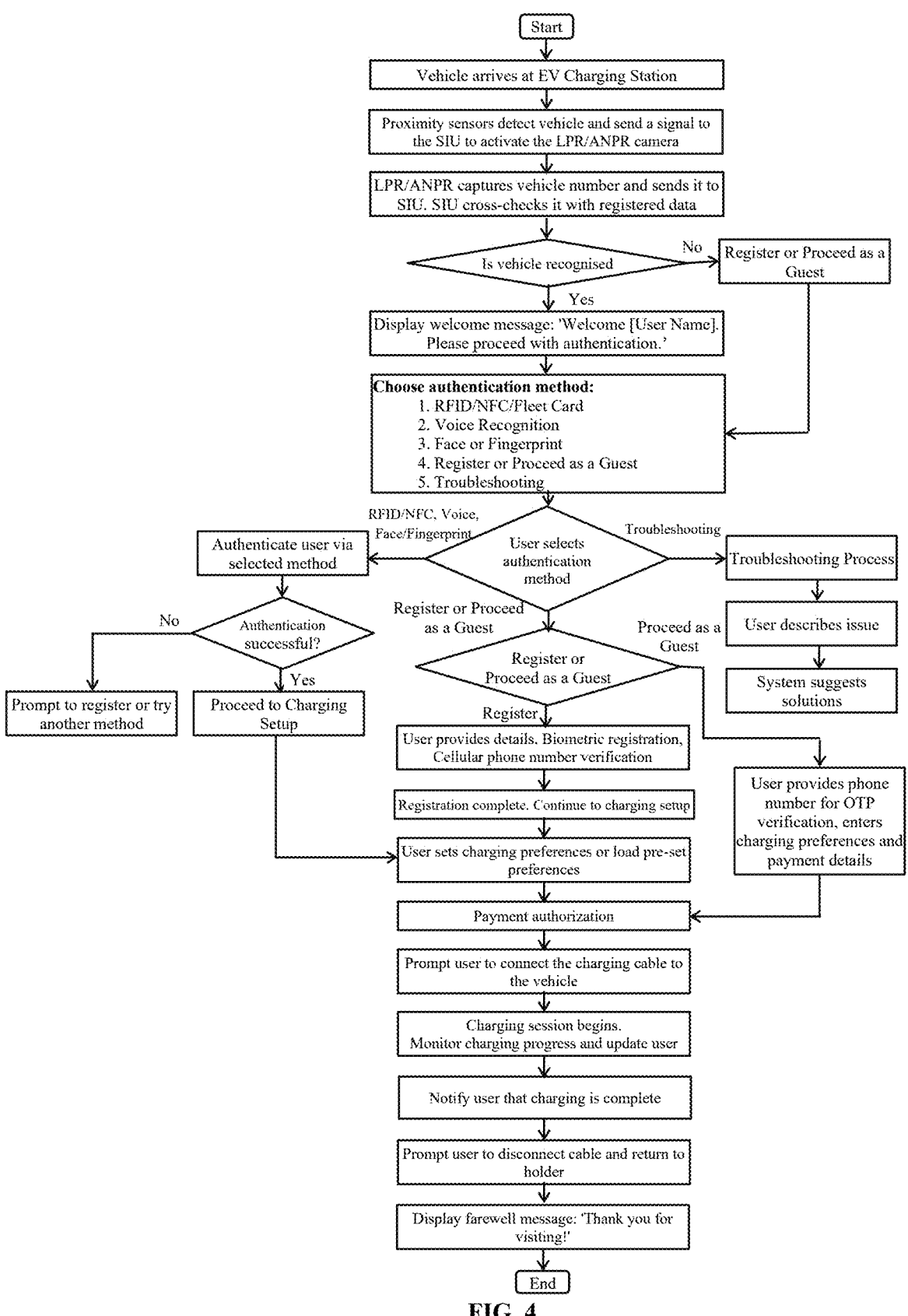
Figure 5:
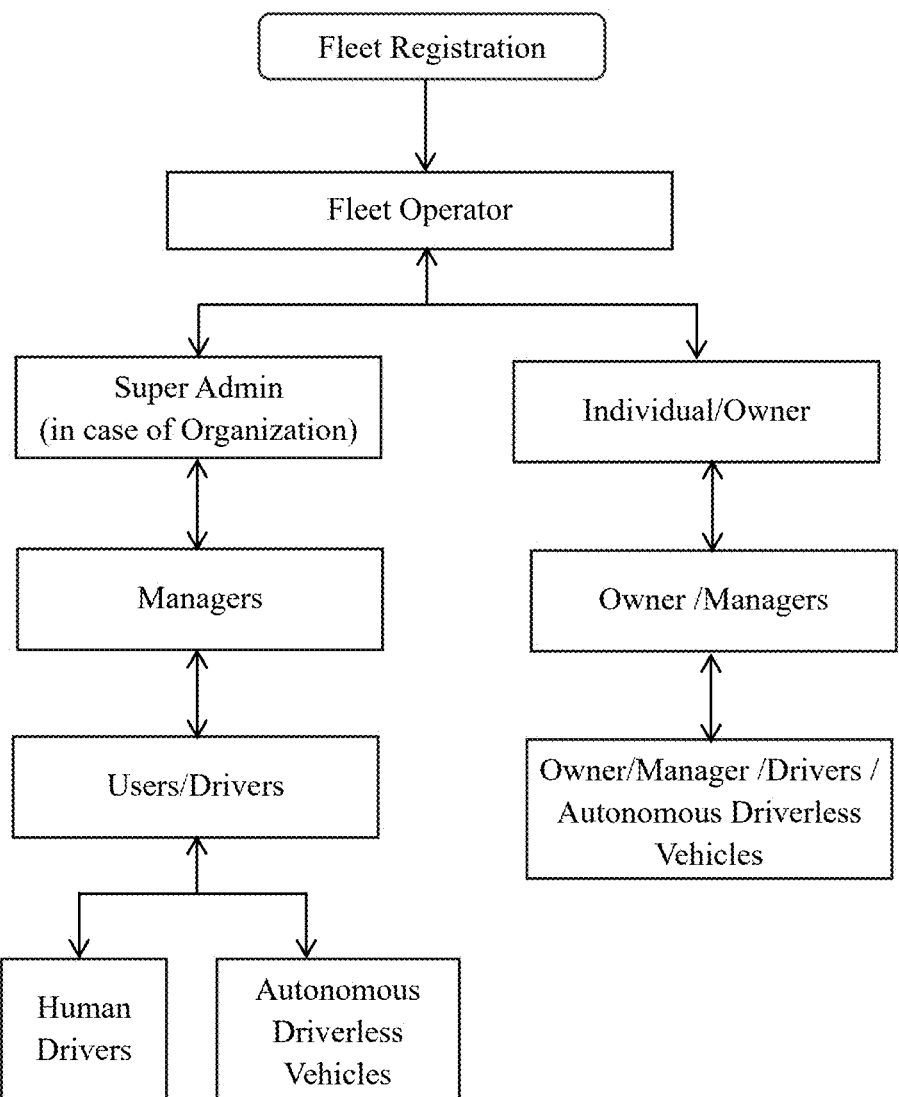

The advantages and features of the present invention will be understood better with reference to the following detailed description and claims taken in conjunction with the accompanying drawings, wherein like elements are identified with like symbols, and in which:

FIG. 1 shows a schematic diagram of a system architecture of an electric vehicle (EV) charging system in accordance with the present invention;

FIG. 2 shows a schematic diagram of a distributed charging station in accordance with the present invention;

FIG. 3 shows a schematic diagram of the sensor interface unit (SIU) of the system in accordance with the present invention;

FIG. 4 shows a Flowchart for the steps of the EV Charging Station in accordance with the present invention; and FIG. 5 shows a flowchart of the hierarchy in fleet registration of the system in accordance with the present invention.

DETAILED DESCRIPTION

An embodiment of this invention, illustrating its features, will now be described in detail. The words "comprising," "having," "containing," and "including," and other forms thereof, are intended to be equivalent in meaning and be open-ended in that an item or items following any one of these words is not meant to be an exhaustive listing of such item or items, or meant to be limited to only the listed item or items.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced items.

The disclosed embodiments are merely exemplary of the invention, which may be embodied in various forms.

Referring now to FIG. 1, an electric vehicle (EV) charging system (100) in accordance with the present invention is illustrated. The electric vehicle (EV) charging system (100) includes a charging station (10) having an electric vehicle charger (20) configured to supply electrical energy to a connected electric vehicle through a charging cable, a sensor interface unit (SIU) (30) that performs local sensing and user interaction, a generative AI module (60) for analyzing authentication, sensor, and network data to detect threats and generate adaptive, context-aware security and control responses, a fleet management module (70) that provides hierarchical access control and session association, and a charging management platform (80) that validates credentials, initiates and monitors charging sessions, records usage data and billing events, and stores preferences.

The electric vehicle charger (20) is coupled to a power delivery unit that enforces commanded output limits, a connector lock, and a cable sensor harness. The electric vehicle charger (20), along with its internal AC/DC power conversion circuitry and associated cabling, forms the power delivery unit that transfers electrical energy from the grid to the electric vehicle under the control of the charging management platform (80). Hereinafter, "the sensor interface unit (30)" is referred to as "the SIU (30)." The SIU (30) includes one or more processors with program memory, a memory, an audio front-end circuitry, an imaging I/O, contact/non-contact credential readers, and one or more network interfaces. Station-side communications may use Ethernet, RS-485, or Controller Area Network (CAN) for wired links and Wi-Fi or Bluetooth Low Energy for wireless links. Backend communications with the charging management platform (80) may use OCPP 1.6/2.0/2.0.1 and/or HTTPS/REST with JSON message bodies, mutual authentication, and transport-layer encryption.

The EV charging system (100) provides electric vehicle charging services and includes one or more electric vehicle chargers (20), one or more proximity sensors (40), and one or more license-plate recognition (LPR) cameras (50). Hereinafter, "the license-plate recognition (LPR) cameras (50)" are referred to as "LPR camera (50)"

The electric vehicle charger (20) represents a range of chargers deployed at various locations, forming a network of electric vehicle chargers (20). Each electric vehicle charger (20) is either equipped with the SIU (30) or is externally connected to the SIU (30) via wired or wireless communication. The electric vehicle charger (20) provides the physical interface where an EV connects for charging and may be AC or DC, unidirectional or bidirectional. For convenience, hereinafter the electric vehicle charger (20) is referred to as "charger (20)." The charger (20) may be a home charger and may communicate with the charging management platform (80) using OCPP (Open Charge Point Protocol) for standardised, reliable data exchange that enables remote monitoring, control, and updates in real time.

Each charger (20) can be configured in standalone, single-charger, dual-charger, or network mode and can operate as part of a larger network for interaction across multiple charging stations (10). Users interact hands-free with the charger (20) through voice commands processed by the SIU (30). The charger (20) includes a display to present notifications and charging information. The charger (20) further includes an RFID/NFC reader that permits user authentication using an RFID card or NFC-enabled device. Upon detection of an authorised RFID/NFC tag, the SIU (30) triggers user authentication and begins session setup. The charger (20) communicates with the charging management platform (80) using OCPP to support session management, status tracking, and diagnostic reporting. The charger (20) communicates with the SIU (30) using internal protocols that integrate voice-enabled interaction with the charger's control system.

Each charger (20) includes sensors that may be embedded within the charger (20) or connected externally. The proximity sensor(s) (40) may include, without limitation, infrared (IR), ultrasonic, lidar, camera, or radar sensors, or combinations thereof, and are arranged to detect the presence of a vehicle in the charging-station bay. The proximity sensors (40) are pole-mounted or integrated into the charger (20) and send a presence signal to the SIU (30). The proximity sensors (40) typically use wired protocols such as RS-485, CAN, or GPIO for direct, low-latency communication with the SIU (30). In advanced configurations, the proximity sensors (40) may use Bluetooth Low Energy (BLE) or Zigbee to communicate with the SIU (30) wirelessly, where cabling is impractical, while maintaining the required sensor-update behaviour for presence detection.

The LPR camera (50) captures and processes license-plate information for vehicle identification using optical character recognition (OCR). The LPR camera (50) is positioned above the charging station entrance or integrated into the charger (20) with an angle selected to reliably capture plates under varying lighting and vehicle speeds. The LPR camera (50) can be an Automatic Number Plate Recognition (ANPR) camera (50). When a vehicle arrives, the LPR camera (50) captures a plate image, and the OCR extracts the plate number. The extracted plate number is transmitted to the SIU (30). The LPR camera (50) may use HTTP/HTTPS or RTSP to send image or video data to the SIU (30).

In one embodiment, as shown in FIG. 2, the charger (20) is part of a distributed charging station (10), where multiple chargers (20) are deployed, multiple chargers work together and are powered by the power delivery unit having multiple power banks (140) connected in parallel to supply energy. Each charger (20) is equipped with the SIU (30), the proximity sensor(s) (40), and the LPR camera (50) to provide enhanced security and automated vehicle authentication.

The SIU (30) is a multifunctional module that manages user authentication and local interaction at the charging station (10). The SIU (30) processes voice commands so that a user may initiate, monitor, and manage charging sessions hands-free, and the SIU (30) facilitates multi-modal biometric authentication, specifically voice recognition, facial recognition, and fingerprint authentication, so that only authorised users can access the charging station (10).

The SIU (30) includes a microphone array (210) for capturing voice commands, a voice processing module (VPM) (220) for command recognition, a facial recognition camera (240) for facial recognition, and a fingerprint sensor (230) for fingerprint recognition, an multi-modal authentication controller (250) for secure user verification, a user interface (270) for seamless interaction and visual guidance, a communication module (280) for connecting to external systems, a lost user credentials retrieval module (260) as a fallback mechanism for users who are unable to authenticate via biometric methods, a speaker (290) for interpreting commands and providing feedback, an AC/DC power supply (300) with a backup battery (310) for uninterrupted operation, and a security monitoring module (320) (as shown in FIG. 3) that continuously monitor SIU components, detecting unauthorized power cable tampering using advanced algorithms and sensor analytics. In an alternative embodiment, the security monitoring module (320) is an independent module that is communicatively coupled to the SIU (30) to continuously monitor SIU components, detecting unauthorized power cable tampering using advanced algorithms and sensor analytics.

The multi-modal authentication controller (250) governs both sequential and parallel verification flows. In a sequential fallback mechanism, authentication is first attempted through voice recognition, followed by facial recognition, then fingerprint recognition, and finally through a one-time password (OTP) process when all biometric methods fail or are unavailable. Each stage of the sequence is independently validated, and failure at one stage automatically activates the next authentication mode without user intervention.

For high-security environments, the SIU (30) supports parallel biometric authentication, wherein two or more biometric factors, such as voice and facial data, or facial and fingerprint data, are processed concurrently. The successful authentication requires that all selected biometric factors produce a valid match result within their respective confidence thresholds.

The authentication levels are configurable by the charging management platform (80) or a fleet policy engine associated with the fleet management module (70). These levels are dynamically determined based on one or more parameters, including transaction value, user preference, or security policy. The SIU (30) receives configuration data from the platform prior to initiating authentication, enabling adaptive security control that scales from standard user access to enterprise-grade or fleet-restricted modes.

The SIU (30) communicates with the charging management platform (80) via REST APIs over secure HTTPS connections, receives proximity data from the proximity sensors (40) and license-plate identifiers from the LPR camera (50), processes this information locally, and verifies it against backend records stored in a customer relationship management (CRM) backend (86) through the charging management platform (80). Hereinafter, the customer relationship management (CRM) backend (86) is referred to as "the CRM backend (86)".

The SIU (30) also transmits user-authentication outcomes and parsed user voice commands to the charging management platform (80) for immediate policy evaluation and session control. The microphone array (210) with high sensitivity provides the primary voice input and, during user registration, records samples to create a voiceprint securely stored in the SIU (30) and the CRM backend (86). The microphone array (210) uses directional capture and proprietary noise reduction to focus on the user's voice in noisy environments.

Further, the voice processing module (VPM) (220) receives the audio signals and performs noise cancellation together with natural-language-processing (NLP) and natural language understanding (NLU), enabling interpretation of commands at ambient noise levels up to 85 dBA. The facial recognition camera (240) captures and analyses facial features for registration and authentication. The facial profile is stored securely in the SIU (30) and CRM backend (86), and the facial recognition camera (240) supports high-resolution imaging with infrared for low-light operation and liveness detection to reject photos or videos. The fingerprint sensor (230) provides biometric verification by scanning the user's fingerprint. The templates are stored in the SIU (30) and CRM backend (86), and the fingerprint sensor (230) is tamper-resistant, enabling fast, precise verification within milliseconds.

The multi-modal authentication controller (250) within the SIU (30) works as a central hub that matches biometric, proximity, and LPR inputs against stored profiles stored in the CRM backend (86) via the charging management platform (80). The multi-modal authentication controller (250) communicates authentication results to the platform in real time and may be implemented using an ASIC, a RISC or CISC processor, an FPGA, or a PLC capable of the required authentication and control functions. The user interface (270) provides visual and interactive feedback through the display for prompts, charging status, and error messages, together with LED indicators for readiness or faults and an optional touch interface for manual input. The speaker (290) provides clear audio feedback and is designed for outdoor durability against dust and moisture.

The communication module (280) facilitates data exchange between the SIU (30), the charger (20), and external platforms, supporting Bluetooth and Wi-Fi for wireless connectivity and Ethernet for wired connectivity, with transmissions protected by advanced encryption standards. The lost user credentials retrieval module (260) implements a fallback path when biometrics cannot be used. The lost user credentials retrieval module (260) is linked to the charging management platform (80) and the fleet management module (70) to generate and validate one-time passwords (OTPs). Upon detection of a failed biometric match, the SIU (30) automatically triggers an OTP request that is transmitted to the registered user's mobile number, e-mail address, or mobile application. The received OTP is entered through the SIU's user interface or mobile companion interface and verified against the server-side credential record maintained by the charging management platform (80). Successful OTP validation restores the authentication sequence, authorising access to the charging session while preserving full audit-trail logging of the fallback event in the CRM backend (86).

The AC/DC power supply (300) provides uninterrupted SIU (30) operation from the charging station (10) or an external source and includes a backup battery (310) with a battery-monitoring circuit. On power failure, the SIU (30) switches seamlessly to backup, with configurable backup duration from 24 hours up to one month, and a battery-management system optimises battery health, charge cycles, and discharge efficiency while an integrated power-management function minimises energy consumption during outages.

The security monitoring module (320) is integrated within the SIU (30) and continuously monitors the status and functionality of the charger (20) and SIU (30) subsystems, including the microphone array (210), the voice processing module (220), the facial recognition camera (240), the fingerprint sensor (230), the multi-modal authentication controller (250), the user interface (270), the communication module (280), the speaker (290), the lost user credentials retrieval module (260), the AC/DC power supply (300), and the backup battery (310).

The AC/DC power supply (300) monitors the power-cable connection in both charging and idle states to detect intentional disconnection or tampering, measuring electrical resistance along the charging cable to detect deviations from nominal values and detecting immediate loss of AC power when the input cable is cut or disconnected. Because the charging cable maintains a specific resistance under normal conditions, any attempt to cut it produces a significant drop in resistance, which is detected by the security monitoring module (320). Upon identifying unauthorised tampering, the security monitoring module (320) triggers audio-visual alerts in the charging station (10) (LED turns red and a siren is activated) and transmits real-time, encrypted security notifications to operator backends, reported to the CRM backend (86) via a CPO platform (90) as configured for further action.

The security monitoring module (320) streams real-time security event data to the generative AI module (60) through the charging management platform (80), so that threat patterns are analysed, response selections are improved, and proactive detection thresholds can be refined. The security monitoring module (320) includes an electrical resistance measurement circuitry (not shown) configured to monitor the continuity and impedance characteristics of the charging cable in real time. The electrical resistance measurement circuitry detects any cuts, punctures, or breaches that may occur along the cable's length by comparing instantaneous resistance values with stored baseline readings. A sudden deviation in measured resistance indicates potential cable damage or unauthorised intrusion.

In conjunction with resistance monitoring, the security monitoring module (320) further comprises a current-sensing circuitry that continuously measures the output current delivered from the power delivery unit to the connected electric vehicle. Any detected anomalies in current flow, such as unexpected surges, drops, or reverse currents, are flagged as irregular events indicative of tampering, short circuits, or forced disconnection.

The security monitoring module (320) also includes a comparative logic circuitry programmed to measure variations between reference and measured resistance or current values. When deviations exceed a predefined threshold limit, the comparative logic circuitry classifies the event as a tamper condition and triggers internal alerts and remote notifications through the charging management platform (80) and the CRM backend (86). This integrated arrangement of resistance measurement, current sensing, and comparative logic components ensures continuous protection of the charging infrastructure against physical tampering or electrical anomalies.

The security monitoring module (320) further comprises a GPS-based location-reporting module configured to attach a geotag to every tamper or intrusion alert generated within the charging system. The GPS coordinates of the charging station (10) are appended to the corresponding alert packet and transmitted through the charging management platform (80) to the CRM backend (86) for accurate event localisation.

To support external coordination, the security monitoring module (320) includes integration interfaces enabling secure communication with law-enforcement networks or approved third-party security databases in accordance with predefined station policy. The integration interfaces utilise encrypted APIs that allow the exchange of tamper-related metadata and incident identifiers while maintaining user-privacy compliance.

The security monitoring module (320) also includes a video-capture trigger logic linked to at least one surveillance or diagnostic camera positioned near the charging area. Upon detection of a cable breach, unauthorised access, or threshold deviation, the video-capture trigger logic issues a command to the connected camera to begin recording or capture a sequence of images. The resulting media file is time-stamped, associated with the geotag, and stored within the CRM backend (86) for subsequent forensic review and evidence preservation.

Further, the security monitoring module (320) is implemented with a fail-safe architecture incorporating a primary processing unit (320a) and a secondary processing unit (320b) that operate in redundant synchronisation. Both processors perform concurrent monitoring of sensor data, and the secondary unit maintains a live mirrored state of the primary unit's operations. Each processor contains a secured boot partition storing essential firmware and cryptographic credentials required for system startup, tamper detection, and communication integrity. The secured boot partition is isolated from external access and remains protected even during abnormal shutdowns or external faults.

Further, an automatic failover logic continuously monitors the health status of the primary processing unit (320a), including heartbeat signals and watchdog timers. Upon detection of a fault, freeze, or processing anomaly, the automatic failover logic transfers operational control to the secondary processing unit (320b) without interrupting active monitoring or event logging. The automatic failover logic preserves all recorded data, ensuring continuity of tamper detection, event timestamps, and alert communication to the charging management platform (80). This redundant architecture provides uninterrupted protection and system resilience under fault or attack conditions.

When the primary processing unit (320a) and the secondary processing unit (320b) are present and healthy, three distinct failover modes are supported to provide continuous, robust monitoring under all conditions, and this redundancy mechanism can be selected for high-security applications. By integrating intelligent algorithms, real-time sensor analytics, and continuous cable/power supervision, the security monitoring module (320) provides a safe, reliable, and tamper-resistant charging environment that prevents cable theft, unauthorised access, and power disruption while feeding station events back to higher-level systems for continuous improvement.

The security monitoring module (320) further comprises an input-power sensing circuitry and a state-logic controller configured to correlate multiple sensor and command inputs to distinguish between authorised maintenance actions and potential tampering. The input-power sensing circuitry is provided within the security monitoring module (320) to continuously monitor incoming electrical supply parameters. Any abrupt loss, fluctuation, or disconnection that does not correspond to a recorded shutdown command is classified as an unauthorised disconnection event. The system (100) distinguishes legitimate grid outages from manual tampering through timestamp verification and command correlation.

The state-logic controller continuously evaluates the operational state of the charger, the authentication status received from the multi-modal authentication controller (250), and service-mode signals from the charging management platform (80). When a maintenance authorisation token or service-mode command is active, the state-logic controller classifies any detected disconnection, resistance change, or current anomaly as a legitimate maintenance event. In the absence of such authorisation, similar anomalies are flagged as tampering incidents and immediately reported through the security monitoring module (320)'s alert framework. This logical differentiation enables accurate identification of true security breaches while preventing false alarms during authorised servicing.

The security monitoring module (320) comprises a machine-learning module, a dynamic-threshold adjustment engine, and a pattern-recognition engine. The machine-learning module was trained on historical datasets of tampering incidents, cable-fault patterns, and environmental variations. The machine-learning module continuously refines its detection parameters through supervised and incremental learning, allowing the system (100) to recognise both previously observed and novel anomaly signatures.

The dynamic-threshold adjustment engine is coupled to the electrical resistance measurement circuitry and the current-sensing circuitry to adapt the permissible tolerance limits in real time. The dynamic-threshold adjustment engine automatically compensates for fluctuations in temperature, humidity, and cable length, thereby preventing erroneous triggers caused by environmental drift.

To further enhance diagnostic accuracy, the pattern-recognition engine analyses temporal sequences of sensor inputs and classifies them according to predefined behavioural models. By correlating resistance deviations and current-flow profiles, the pattern-recognition engine distinguishes genuine tamper events from transient electrical noise, thus reducing false-positive security alerts. All threshold changes, learning updates, and detection results are logged within the CRM backend (86) for continuous audit and performance calibration.

Further, the generative AI module (60) provides immediate, context-aware assistance during user interaction by generating responses, personalised recommendations, and troubleshooting guidance for authentication errors, charging problems, payment issues, or other technical difficulties, and it escalates to a human customer-service agent when required.

The generative AI module (60) incorporates a continuous-monitoring engine configured to analyse user-authentication attempts, network-communication patterns, and physical-sensor inputs received from the security monitoring module (320) across multiple charging stations (10). The continuous-monitoring engine applies statistical and neural-network-based anomaly-detection models to identify deviations in access frequency, transaction sequence, or signal consistency that may indicate potential security threats or operational irregularities.

Further, the generative AI module (60) comprises a credential-protection module designed to detect credential-spoofing and man-in-the-middle (MITM) attacks targeting authentication or payment data. The credential-protection module performs continuous integrity checks on encrypted communication channels and user tokens. Upon detection of abnormal credential behaviour or replayed authentication packets, the credential-protection module (602) immediately commands the SIU (30) to escalate authentication requirements, such as invoking additional biometric factors or issuing a one-time password challenge. All detected incidents and mitigation actions are logged in the CRM backend (86) for audit and security-policy refinement.

The generative AI module (60) further comprises a natural-language-processing (NLP) engine configured to interpret user-voice inputs received from the SIU (30). The NLP engine converts captured speech into structured commands through tokenisation, intent recognition, and semantic-parsing layers, thereby enabling context-aware interaction between the user and the system (100).

The generative AI module (60) includes a deep-learning model trained on historical cyber-attack and intrusion datasets encompassing network anomalies, spoofing patterns, and previously recorded threat signatures. The deep-learning model continuously refines its parameters to enhance detection accuracy for new and evolving security vectors.

Further, the generative AI module (60) includes a reinforcement-learning engine that operates in conjunction with the deep-learning model to dynamically adjust the system's threat-response policies over time based on observed outcomes. Each successful or failed mitigation episode is evaluated through reward functions that incrementally optimise the decision strategy of the generative AI module (60). This continuous-learning approach enables the generative AI Module (60) to evolve its defensive behaviour autonomously, improving both cybersecurity and operational reliability across all connected charging stations (10).

The generative AI module (60) includes a user-behaviour profiling module configured to establish and maintain baseline interaction patterns for each registered user. The user-behaviour profiling module observes historical parameters such as authentication frequency, voice-command cadence, session duration, preferred charging time, and geographic usage distribution. From these data points, the user-behaviour profiling module generates a behavioural signature unique to each individual user or fleet driver.

Further, the generative AI module (60) includes a risk-scoring engine that continuously compares real-time user activities with the stored baselines to identify deviations or anomalous behaviours. When deviations exceed a calculated confidence threshold, the risk-scoring engine quantifies the anomaly as a numerical risk score and publishes this score to the SIU (30) and the fleet management module (70) through the charging management platform (80). The receiving module then applies the risk score to adapt authentication levels, session permissions, or alert priorities accordingly.

The generative AI module (60) further comprises an automated response module configured to execute escalation protocols corresponding to the severity and type of detected anomaly. When abnormal user behaviour, credential irregularities, or network anomalies are identified, the module initiates progressive escalation actions ranging from user warnings and authentication-delay prompts to temporary account lockouts or session termination.

Upon detection of suspicious login behaviour, the automated response module triggers multi-factor authentication (MFA) procedures by instructing the SIU (30) to request additional biometric or OTP verification before granting further access.

The generative AI module (60) also maintains a cooperative interface with the security monitoring module (320) to enable integrated physical and cyber-threat mitigation. In response to high-risk or coordinated attacks, the automated response module can command the security monitoring module (320) to temporarily suspend operation of the power-delivery unit (25) until the threat is resolved. All escalation events, verification logs, and mitigation actions are recorded within the CRM backend (86) for audit and post-incident analysis.

The generative AI module (60) incorporates a deception framework comprising one or more honeypot charging ports that simulate legitimate charging interfaces to attract and isolate unauthorised connection attempts. These virtual or physical ports appear operational to an intruder but remain electrically and logically disconnected from the power delivery unit, thereby enabling observation of adversarial behaviour without risking system integrity. Further, a decoy-data generation module, linked to the deception layer, is configured to produce non-operational session data, including fabricated transaction identifiers, user prompts, and loadcurve simulations, presented to unauthorised users through the same interface. The generated data prevents exposure of real credentials and assists the AI engine in analysing intrusion patterns for adaptive model retraining.

The generative AI module (60) further includes an automated incident-reporting module programmed to compile AI-generated summaries of detected intrusion or tampering events. Each summary encapsulates key metadata such as timestamp, geolocation, attack vector, and system response outcome, and is securely transmitted to designated security authorities or monitoring centres through encrypted communication channels. All reported events are archived in the CRM backend (86) for compliance auditing and post-incident forensics.

The generative AI Module (60) further comprises a blockchain-integrated event-logging module configured to record every tamper alert, authentication event, and cybersecurity incident into an immutable distributed audit trail. Each log entry is cryptographically signed and timestamped before being appended to the blockchain ledger maintained across multiple charging stations (10). The blockchain-integrated event-logging module ensures permanent record integrity and provides a verifiable chronological history of system activity for compliance and forensic analysis.

To enable collaborative threat mitigation, the generative AI module (60) incorporates a federated-learning framework that allows the sharing of threat-intelligence parameters, such as anomaly vectors and attack patterns, across distributed charging stations without transmitting user-identifying information. The federated-learning framework updates are aggregated centrally and redistributed as anonymised weight adjustments, enhancing the collective detection capability of geographically separated stations while preserving data privacy.

For advanced data protection, the generative AI module (60) includes a post-quantum cryptography engine that secures credentials, digital signatures, and audit logs using quantum-resistant key-establishment and signature schemes. The post-quantum cryptography engine safeguards long-term confidentiality against future quantum-computing threats, ensuring that even archived records within the blockchain-based audit system remain cryptographically secure.

The generative AI module (60) continuously receives feedback from the security monitoring module (320), including events for unauthorised power disconnections, cable cutting, and credential spoofing. This feedback loop enables immediate assessment and selection of appropriate countermeasures. The generative AI module (60) improves detection capabilities over time by learning from past security incidents, logs, user interactions, network behaviours, and newly emerging threats through continuous updates. For coordinated operation, the generative AI module (60) communicates with the CRM backend (86) to retrieve user profile, preferences, and historical data to support personalized assistance, and the generative AI module (60) interacts with the charging management platform (80) to obtain real-time charging-station status, session data, and maintenance alerts, the generative AI module (60) and the CRM backend (86) communicate using protocols such as REST APIs, SOAP, OCPP, and MQTT over TLS/SSL-secured channels.

Further, the fleet management module (70) is configured to provide hierarchical, secure management of electric vehicle (EV) fleets within the charging ecosystem. The fleet management module (70) operates in coordination by communicating with the SIU (30) and the generative AI module (60) through the charging management platform (80) fleet registration, authentication, charging authorisation, risk-scoring, and session tracking. The fleet management module (70) communicates with both the sensor interface unit (SIU) (30) and the generative AI module (60) through the charging management platform (80), ensuring that all authentication, risk-scoring, and fleet-data exchanges occur through a secure and centralised control layer. The fleet management module (70) enables fleet operators, managers, and drivers to manage multiple vehicles efficiently through structured role-based access and authentication protocols, ensuring both operational scalability and system security.

The fleet management module (70) incorporates a fleet registration module that assigns a unique fleet identifier (fleet ID) to each registered organisation or individual fleet owner. The fleet ID serves as the primary reference for all related vehicles, users, and transactions. During registration, the fleet registration module establishes hierarchical user roles such as super administrator, manager, and driver. Each role is associated with specific privileges and authentication rights. The super administrator is authorised to perform billing operations, create fleet accounts, and manage user access rights. The manager is authorised to register vehicles, assign drivers, and monitor session activities. The driver is authorised to initiate and terminate charging sessions and view status updates, ensuring a controlled access environment that prevents unauthorised actions.

The fleet management module (70) further includes a driver authentication submodule, configured to issue time-limited One-Time Passwords (OTPs) for temporary or substitute drivers. The driver authentication submodule enables dynamic assignment of access credentials without compromising the integrity of the system (100). The driver authentication submodule also enforces geofencing restrictions, allowing charging sessions to be initiated only within a designated charging station (10) or geographic boundaries defined by the fleet operator or the charging management platform (80). In the event of driver-profile modifications or access attempts occurring outside predefined geofenced boundaries, the driver authentication submodule generates automated alerts to the managers, the alerts being prioritised using the risk score provided by the generative AI module (60), which continuously monitors user behaviour and network activity to detect anomalous conditions.

The fleet management module (70) also includes a fleet card management module, which issues either physical or virtual fleet authentication cards linked to the fleet ID. These cards facilitate secure access for fleet personnel and can be integrated with RFID, NFC, or digital wallet systems for seamless authentication. Additionally, the fleet management module (70) includes an autonomous vehicle support module to authenticate vehicles automatically via embedded RFID/NFC tags or Plug and Charge (PnC) communication protocols without requiring driver input.

The fleet management module (70) further includes a charging schedule optimisation module. The charging schedule optimisation module utilises historical usage data, predictive analytics, and load forecasts generated by the generative AI module (60) to allocate optimal session times, charging durations, and power limits across the fleet. The charging schedule optimisation module ensures equitable power distribution, minimises wait times, and enhances overall energy efficiency.

Each charging session initiated through the fleet management module (70) is automatically associated with the corresponding vehicle identifier and driver identity under a fleet account. Further, the fleet management module (70)

includes a session tracking module that records these associations in real time and communicates session details such as duration, energy consumption, and billing information to the charging management platform (80) and the CRM backend (86) for centralised reporting and analytics.

Furthermore, the charging management platform (80) manages, monitors, and optimizes operation of the charger (20) and integrates with an admin portal (82), a payment gateway (84), the CRM backend (86), an Electric Mobility Provider (EMP) Platform (88) (hereinafter EMP platform (88)), a Charging Point Operator (CPO) Platform (90) (hereinafter CPO platform (90)), the generative AI module (60), and fleet management module (70), acting as the central hub for smooth communication and coordinated operation across the charging ecosystem. The charging management platform (80) provides real-time control and monitoring of chargers, processes user-authentication requests from the SIU (30), manages charging sessions, and handles payments and reporting. The charging management platform (80) tracks charger status (online, offline, in use), supports remote operations including start, stop, and reset, and provides over-the-air updates, system-health monitoring, and error logging for efficient maintenance.

For authentication, the charging management platform (80) receives inputs from the SIU (30), including voice recognition outputs, biometric matches, RFID reads, proximity detections, and LPR/ANPR results to verify credentials and generate session tokens for secure access. The SIU (30) manages charging sessions by recording energy consumption, session duration, and costs, provides real-time session updates via the EMP platform (88) or the display, and synchronises session and billing details with an EMP application.

The charging management platform (80) includes temporary storage for active monitoring and long-term storage of session history, user profiles, and user feedback in the CRM backend (86), with dashboards that allow operators to view usage, revenue, and performance. For payments, the charging management platform (80) validates transactions, supports flexible pricing models, and integrates multiple payment methods such as credit/debit cards, digital wallets, and subscriptions. The charging management platform (80) implements security measures for sensitive data, including encrypted communications (TLS/SSL), role-based access control for operators, regular security audits, and compliance with data-protection laws and standards (for example, GDPR and ISO 27001). The communication between the charging management platform (80) and the admin portal (82), the payment gateway (84), the CRM backend (86), the generative AI module (60), the fleet management module (70), the CPO platform (90), and the EMP platform (88) occurs via secure HTTP/HTTPS APIs.

The admin portal (82) provides administrators with an interface to monitor, control, and configure the charging infrastructure by presenting real-time data on charger health, status, and user sessions. The admin portal (82) supports user-management functions including creation, editing, and deletion of user profiles and the management of multi-modal authentication methods such as voice, face recognition, and fingerprint biometrics, and allows administrators to configure user access and permissions for secure, personalised operation. The admin portal (82) enables oversight of the charger operations, energy usage, session durations, and billing. The admin portal (82) obtains session details and power-usage data from the charging management platform (80), and the admin portal (82) can display payment status, generate invoices, and manage revenue by retrieving transaction histories from the charging management platform (80), which in turn communicates with the payment gateway (84).

For customer relationship management, the admin portal (82) accesses the CRM backend (86) through the charging management platform (80) to view and update customer profiles, service requests, interaction histories, preferences, support tickets, and customer feedback, ensuring a consistent and secure data flow. The security in the admin portal (82) is enforced by multi-factor authentication and role-based access control, with SSL/TLS-encrypted communications to other systems, and the admin portal (82) provides a web-based interface for remote access together with customizable dashboards for key metrics such as energy consumption, revenue, and the charger (20) utilisation.

The payment gateway (84) enables secure payment processing after a charging session. The payment gateway (84) supports payment methods including credit and debit cards, digital wallets, and other online mechanisms, authorises and verifies transactions with issuing banks or providers, and protects financial data using encryption and tokenisation compliant with PCI DSS. The payment gateway (84) communicates with the charging management platform (80) via HTTP/HTTPS APIs to securely transmit payment details and finalise transactions, using TLS/SSL encryption for financial data in transit.

The CRM backend (86) manages customer interactions across the EV-charging ecosystem by storing and organising user profiles, charging history, payment information, and user preferences so that services can be tailored. The CRM backend (86) stores multi-modal authentication data (voice, facial, fingerprint templates) for seamless authentication at charging stations (10). The CRM backend (86) tracks interactions such as queries, complaints, feedback, and requests to provide a 360-degree view of each customer and to support efficient resolution by customer service representatives. The CRM backend (86) captures communication metadata (emails, calls, messages) to ensure proper follow-ups. The CRM backend (86) stores detailed records of charging sessions, energy consumed, duration, and costs for accurate invoices, billing-cycle management, and transparent transaction histories. The CRM backend (86) supports ticket and case management by categorising and prioritising issues and enabling automated or manual agent communications, and the CRM backend (86) provides tools for marketing campaigns, promotions, and loyalty programs tailored to behaviour, preferences, and location, together with tracking of campaign effectiveness. Through secure HTTP/HTTPS APIs, the CRM backend (86) receives real-time updates on charging sessions, payments, and other information from the charging management platform (80).

The EMP platform (88) is a user-focused system for accessing, managing, controlling, and paying for charging services across multiple networks. The users register, authenticate, and control charging sessions through a mobile app (Android/iOS) and web portal (95). The EMP platform (88) integrates with the charging management platform (80) to support pay-per-use, subscription-based, or time-based pricing models. The EMP platform (88) enables roaming so that users can charge at the charging station (10) managed by different operators under interoperability agreements, provides real-time notifications and session history, and offers personalised promotions and loyalty rewards to enhance user experience.

The CPO platform (90) manages the operation, maintenance, and availability of the charging stations (10). The CPO platform (90) supports real-time charger monitoring, remote diagnostics, and dynamic load balancing to optimise energy distribution. The CPO platform (90) tracks charger status (online, offline, occupied, under maintenance), allows remote start/stop/reset, and integrates with the charging management platform (80) and the EMP platform (88) to ensure seamless user authentication, session tracking, and billing.

Further, an external EMP platform (88E) is provided to enable users to discover, authenticate, and initiate charging sessions at third-party CPO-managed stations beyond the primary network. The external EMP platform (88E) provides roaming interoperability so that session management, billing, and reporting work across providers. The communication between the external EMP platform (88E) and the CPO platform (90) is established via OCPI (Open Charge Point Interface) or secure API protocols such as REST/HTTPS, OAuth 2.0, and OpenID Connect for secure data exchange and cross-network compatibility. Furthermore, an External CPO Platform (90E) allows charging stations (10) managed by a CPO to be discovered and utilised by users from different EMP networks, supporting session validation, payment processing, and data synchronisation across service providers, with exchanges facilitated via OCPI or secure APIs to maintain interoperability across multiple charging networks.

Further, the mobile app (Android/iOS) and web portal (95) are provided to operate as primary user interfaces that allow users to locate, book, and manage charging sessions. The mobile app (Android/iOS) and web portal (95) display real-time charger availability, live charging progress, estimated completion time, and cost information, and the mobile app (Android/iOS) and web portal (95) processes payments using credit cards, UPI, digital wallets, or corporate accounts. The mobile app (Android/iOS) and web portal (95) maintain user profiles, session history, and receipts for tracking, and they provide customer support, completion notifications, and alerts for upcoming charges to deliver a convenient and user-friendly experience.

In the present embodiment, the charging station (10) communicates with a server (5) consisting of the charging management platform (80), the admin portal (82), the payment gateway (84), the CRM backend (86), the generative AI module (60), the fleet management module (70), the CPO platform (90), and the EMP platform (88). The server (5) may be implemented using personal computers, laptops, mainframes, cloud-based servers, or distributed networks capable of executing machine-readable instructions. The server (5) includes a software stack which utilises Java-based frameworks, .NET frameworks, PHP frameworks, or other web application architectures. The deployment of the server can be on-premise (physically within an operator's premises), in a hybrid on-premise/cloud configuration that combines local and cloud resources, or entirely in the cloud using remote servers and services accessed over the internet, thereby enabling scalable performance, distributed load handling, and secure, redundant operation across the full charging ecosystem.

Referring now to FIG. 4, the working of the system (100) is illustrated in a non-limiting method.

At Step 1, when the electric vehicle arrives in the charging-station bay, the proximity sensors (40) detect the vehicle's presence and signal the SIU (30) to activate the LPR camera (50). Upon receiving the presence event, the multi-modal authentication controller (250) within the SIU (30) enables the LPR camera (50), which captures an image of the license plate and processes it to extract the vehicle number. The extracted vehicle number is transmitted to the SIU (30) for cross-checking against previously registered user data. For this purpose, the multi-modal authentication controller (250) communicates with the charging management platform (80), which in turn interacts with the CRM backend (86) to retrieve stored user and vehicle records. The SIU (30) verifies the vehicle number for authentication and first determines whether the vehicle is registered as part of a fleet. If the vehicle is recognised, whether as a fleet asset or an individual user's vehicle, the charger (20) display and the SIU (30) announce: "Welcome [User Name]/[Vehicle Number]. Please proceed with authentication."

If the vehicle is not recognised, the charger (20) display and the SIU (30) announce: "Vehicle not recognised. Please register your vehicle to continue." For non-fleet users, the SIU (30) presents initial options such as tap an RFID/NFC card, speak for voice recognition, use face or fingerprint recognition, register or proceed as a guest, or initiate troubleshooting. The user may speak the chosen option or select the option on the touchscreen.

For fleet authentication, the system (100) recognises a fleet vehicle from the LPR camera (50) result. Before arrival, the manager or owner associates the driver's cellular number for that vehicle within the mobile app. Once the fleet vehicle is identified, the system (100) sends a one-time password (OTP) to the registered driver's cellular number. The driver then enters the OTP on the terminal or speaks the OTP for authentication. If the OTP is correct, the system (100) confirms, "Verification complete! The fleet vehicle is now authorised for charging," and the driver proceeds to Step 5.

If the OTP is incorrect or expired, the SIU (30), in coordination with the security monitoring module (320), alerts the driver and the fleet owner that "OTP invalid or expired. Please try again." As an alternative for fleets, a fleet card may be used. The driver taps the fleet card at the charging station (10) for authentication. For autonomous driverless vehicles, authentication proceeds automatically using a card reader or Plug and Charge (PnC) protocol. The managers and owners can subsequently track and manage registered fleet vehicles' charging sessions via the mobile app.

At Step 2 (User authentication options). For Option 1, that is RFID/NFC authentication, the user taps an RFID card or scans an NFC-enabled device. If the RFID/NFC credential is registered, the system (100) greets the user-"Hello, [User Name]. Please proceed to start charging." and the user moves to Step 5. If the credential is not registered, the SIU (30) prompts, "This card/device is not registered. Please choose one of the following options," after which the user can register, proceed as a guest, or choose another authentication method. The registration continues at Step 5 (new user registration), and guest access continues at Step 3 (guest user flow).

For Option 2, that is voice recognition, the SIU (30) requests, "Please say your name or the phrase you registered with." The multi-modal authentication controller (250) captures the user's voice characteristics and, via the charging management platform (80), accesses the voiceprint stored in the CRM backend (86). The SIU (30) computes a similarity score between the captured voice and the stored voiceprint and applies a threshold to distinguish genuine from imposter attempts. If the threshold is exceeded, the system (100) responds, "Hello, [User Name]. Please proceed to start charging," and the user proceeds to Step 5; if not, the system (100) prompts, "We couldn't recognize your voice. Please choose one of the following options," and the user may register, proceed as a guest, or select another method (registration at Step 5; guest at Step 3).

For Option 3, that is, face or fingerprint recognition, the SIU (30) announces, "Please use face or fingerprint recognition to authenticate," and the user selects face or fingerprint. In the face recognition flow, the user positions their face before the facial recognition camera (240) of the SIU (30). The system (100) accesses the facial profile in the CRM backend (86) through the charging management platform (80), analyses facial features, and compares them to the registered data. If a match is found, the SIU (30) responds, "Hello, [User Name]. Please proceed to start charging," and directs the user to Step 5, if not, the SIU (30) prompts for registration, guest access, or an alternate method (registration at Step 3; guest at Step 4).

In the fingerprint recognition flow, the user places a finger on the fingerprint sensor (230) of the SIU (30). The SIU (30) accesses the fingerprint profile via the charging management platform (80) from the CRM backend (86), compares features with registered data, and if a match is found, responds, "Hello, [User Name]. Please proceed to start charging," and proceeds to Step 5; otherwise, The SIU (30) offers registration, guest access, or another method (registration at Step 3; guest at Step 4).

When OTP verification is required because all biometric paths fail, the SIU (30) asks for the user's cellular mobile number. The user provides the number by touch or voice, and the SIU (30) checks whether the number is registered. If registered, an OTP is sent to that number. The user provides the OTP by entry or voice, and the SIU (30) verifies it. If correct, the SIU (30) confirms, "OTP verified successfully. You can now proceed," and the user proceeds to Step 5. If incorrect, the SIU (30) prompts a retry or offers guest access or registration (guest at Step 4; registration at Step 3). If the number is not registered, the SIU (30) asks, "The mobile number you entered is not registered. Would you like to register now?" and continues to registration upon "Yes," or exits upon "No."

For Option 4, that is, register or proceed as a guest, the user selects "Register" and continues at Step 3 for new user registration, or selects "Proceed as a Guest" and continues at Step 4 for guest flow.

For Option 5, that is, troubleshooting, the SIU (30) requests the user to describe or choose the issue, such as registration problems, payment errors, the charger (20) not starting, connection/authentication failure, or other, and provides context-appropriate suggestions.

For registration issues, the SIU (30) may advise checking whether the voice recording completed successfully and, if needed, re-registering the voice. For payment issues, the system (100) suggests validating the payment method and available funds. For the charger (20) issues, the system (100) suggests verifying the cable connection and the charger's power state. If self-service does not resolve the issue, the user may contact support by chat, phone, or email, and after troubleshooting a follow-up message may be sent via the app, email, or SMS and announced through the speaker (290) of the SIU (30). For guest users during troubleshooting, the system (100) requests a cellular number to send an OTP. If the OTP matches, troubleshooting proceeds; otherwise, the user may re-enter the number or seek assistance.

At Step 3. Users may register as individual users or fleet users. For individual registration, the system (100) supports registration via the mobile app and web portal (95) or at the EV station interface. In the mobile app flow, a QR code is displayed on the terminal to download the app, or the user downloads it from an app store. If registration is done via the mobile app and web portal (95), fingerprint registration can be completed later at the charging station (10) as an optional secondary method. In the EV station interface flow, the user provides name (first and last), cellular phone number (with country code), email, payment information (credit/debit card or wallet), and vehicle details (make/model, VIN, and registration number). The user also sets a duress word such as "Midnight Light" or "5920", when spoken during distress, triggers silent emergency assistance. The system (100) then offers RFID/NFC linking-"Would you like to link your RFID/NFC card for future use?" If accepted, the user taps the card to associate it with the account.

The user may complete biometric registration across voice, face, and fingerprint. For voice, the SIU (30) records, "Please say 'Hello Charger' three times to complete your voice registration." For face, the SIU (30) prompts, "Please look at the camera for a few seconds to complete your facial recognition setup." For fingerprint, the SIU (30) instructs, "Please place your finger on the scanner to complete your fingerprint registration." After submission, a summary is displayed—"You are registering as [First Name Last Name] with phone number [+Country Code] [Phone Number]. Please verify and confirm to proceed."—and the user can confirm or edit details. Upon confirmation, an OTP is sent to the provided cellular number for verification. Once verified, the system (100) generates a unique ID for the new user, links all user details (personal, payment, vehicle, and biometric) to that unique ID, and stores the information securely in the SIU (30) and the CRM backend (86) via the charging management platform (80). The account is activated, and a welcome message is displayed and sent by email and SMS: "Registration complete! Your RFID/NFC card, multimodal authentication, and vehicle details are now linked to your account."

For fleet registration, the fleet operator or owner initiates registration using the mobile app or the EV station interface. A QR code is presented at the terminal to download the mobile app, with fingerprint registration optionally completed later at the charging station (10). In the EV station interface flow, the operator registers either as an organisation or as an individual. For an organisation, the super administrator is designated and provides their name, cellular phone number (with country code), and company email (with optional backup email). An OTP is sent to the phone and email for verification, after which a unique fleet ID is generated. For an individual owner (not an organisation), the owner registers as super administrator with name, cellular number, and primary email; an OTP is sent to the phone for verification, after which a unique fleet ID is generated.

After super administrator authorisation, manager registration proceeds by providing the manager's name and phone number, the manager completes registration using the same phone number provided by the super administrator. The super administrator may then authorise additional managers or register drivers. The fleet details include a fleet name (e.g., "XYZ Company Fleet"), a list of users/drivers (human drivers or autonomous vehicles), and fleet vehicle information for multiple vehicles, including make/model, VIN, and registration number; the system (100) supports batch registration of multiple vehicles. Payment information can include credit/debit card, bank details, or digital wallet, and payment methods can be postpaid (periodic billing based on usage) or prepaid (advance payment with deductions from balance) as arranged with the charging operator. Biometric registration for fleet users is performed similarly to individual users, with voice, face, and fingerprint flows supported by the SIU (30).

After all details are entered, a manager confirmation screen is shown—"You are registering the fleet [Fleet Name] with [Number of Vehicles] vehicles. Please confirm to proceed."—with options to confirm or edit. Upon confirmation, an OTP is sent to the manager's registered cellular number. After successful verification, a fleet account is activated, and the system (100) confirms, "Fleet registration complete! Your fleet details are now linked to your account." All records are linked to the fleet ID, and the manager can manage vehicle access and charging. A secure fleet card may be issued to super administrator, managers, and drivers as a physical card or a virtual card in the mobile app, linked to the fleet ID for secure access. For autonomous driverless vehicles, the secure fleet card may be attached to the vehicle or enabled through Plug and Charge or a combination of both. (FIG. 5 illustrates the hierarchical structure of the fleet registration process and shows that an individual can be an owner who may act as a manager, a driver, or own an autonomous driverless vehicle.)

At Step 4. For guest access, the system (100) prompts the guest to enter a cellular phone number via the touchscreen or by voice. Then an OTP is sent to the cellular phone number, the guest enters the OTP for verification, and the multi-modal authentication controller (250) verifies the OTP. If correct, the system (100) proceeds to collect charging details; if incorrect, the guest may request a resend or re-enter the number. Once authenticated, the system (100) gathers charging preferences by voice or touchscreen, including charging by kWh or a fixed session time or amount, and payment method selection such as credit/debit card (via terminal or app), digital wallets (e.g., Google Pay/Apple Pay), or cash. The collected details are securely transmitted to the CPO platform (90) for processing and session setup. The system (100) then presents a guest summary prompt-"You selected [preference]. Please confirm to proceed."—and after confirmation, the CPO validates the information, and the process advances to Step 5.

At Step 5. For authenticated users, the system (100) automatically loads pre-set preferences stored in the CRM backend (86). For guest users, the preferences provided during setup are used. The fleet users can select a fleet charging plan from pre-configured options, such as bulk rates, preferred charging times, or fleet-specific discounts. If the vehicle is a registered fleet vehicle, it is automatically identified, and any relevant preferences are loaded. If multiple fleet vehicles are associated with the user, the system (100) allows selection of the specific vehicle to charge or supports batch session setup. For payment authorisation or collection, a pre-authorised payment can be used, where the CPO platform (90) verifies payment methods (e.g., RFID, NFC, or digital wallet) and communicates with the payment gateway (84) to ensure available funds before starting the session. If the user pays via an attendant (e.g., cash), payment is collected before the session starts.

For terminal or in-app digital payment, the system (100) prompts the user to complete payment using methods such as credit/debit cards at the terminal or digital wallets (e.g., Google Pay, Apple Pay, Amazon Pay, UPI). The fleet payment may use a secure fleet card or the fleet's preferred payment method, and may be postpaid or prepaid. The payment is validated via the payment gateway (84) of the charging management platform (80) before the session starts. The mobile app (EMP application) synchronises user preferences and payment details with the CRM backend (86) to track activity, loyalty programs, and session history. The CPO platform (90) ensures real-time validation and monitoring of the charging session. After payment is validated, the system (100) prompts, "Please connect the charging cable to your vehicle." The user connects the charging cable, and the system (100) verifies the connection. In an alternative embodiment, a robotic arm may connect the cable automatically.

During charging, the system (100) provides real-time updates on the display of the charging station (10) and/or the mobile app and may announce current kWh consumed, time remaining, progress toward a preset target, and any additional selected parameters. The system (100) also provides vehicle-related insights, including identification of whether AC or DC charging was used; charging profiles with state of charge (SOC) before and after; backup battery (310) health status and degradation monitoring; and mileage tracking based on GPS-derived distance and energy consumption. Energy usage is calculated from SOC data, and mileage is computed using:

$$\text{Mileage (km/kWh)} = \text{Distance Travelled (km)/Energy Consumed (kWh)}.$$

For example, for a distance of 120 km and a 50 kWh battery where the SOC after driving is 25% (i.e., 75% used), energy consumed is $0.75 \times 50$ kWh=37.5 kWh, yielding mileage=120/37.5=3.2 km/kWh.

At Step 6. When charging completes, the system (100) notifies the user through multiple channels. The mobile app sends a push notification-"Charging complete! Your vehicle is fully charged." An SMS message is sent to the registered phone number—"Charging complete! Your vehicle has finished charging." An email is sent to the registered address—"Your vehicle has been fully charged. Thank you for using [Charger Name]." The electric vehicle's display changes colour (e.g., to green) to indicate completion. The SIU (30) announces, "Charging complete! Your vehicle is fully charged. Please disconnect the charging cable." The display of the charging station (10) shows: "Charging complete. Please disconnect the cable."

At Step 7. The system (100) prompts the user to disconnect the charging cable and return it to the station holder. Where applicable, the robotic arm automatically disengages. The user may select receipt options, including an email receipt or an on-screen/printed receipt for immediate viewing and printing. The system (100) then provides a farewell message: "Thank you for visiting [Charger Name]. Have a great day!"

Further in alternative embodiment, the system (100) supports a Personalized Experience in which, after registration, users can set preferences such as charging speed (e.g., fast charge, eco mode), notifications for charging completion or station departure, and favourite stations or frequent locations for easier access to nearby chargers, a personalized voice assistant via the SIU (30) provides updates, such as charging progress, payment confirmations, or issues (e.g., cable disconnection), and Personalized Greeting behaviour includes Time-Based Greetings that adjust based on the time of day (e.g., "Good morning," "Good afternoon"), Region-Based Greetings that localize greetings based on the user's region or location in available languages, and Language Personalization that customizes greetings according to the user's preferred language. The system (100) extracts the information from the user's profile (like preferred language) maintained in the CRM backend (86) or detects the local time and region based on GPS and IP address. If no personalised data is available (like if a new user is using the system (100)), the greeting can be neutral or default to the system's standard.

Furthermore, in another embodiment, the system (100) provides integration with the mobile app and web portal (95)

in which Pre-Booking/Reservation & Scheduling allows users to pre-book/reserve charging slots via the mobile app, reducing wait times and allowing for scheduling flexibility, and the mobile app sends reminders about session times and confirms arrival; and the mobile app integration enables users to track charging history, check receipts, set spending limits, and review the carbon footprint of charging activities, with data synchronized between the mobile app and the charging management platform (80) and CRM backend (86).

In alternative embodiment, the system (100) supports Enhanced Payment Options in which Subscription Services provide prepaid subscription models with discounted rates or access to premium stations and services (e.g., fast charging, valet parking). The payment gateway (84) integration supports a variety of payment methods, including traditional methods (credit card, Apple Pay, UPI, Google Pay, Amazon Pay, pre-stored wallets) and newer options (cryptocurrency).

The system (100) provides charging session monitoring & notifications in which session monitoring presents real-time charging status on the display of charging station (10) or the mobile app, reducing wait times and helping users plan accordingly; and notifications during charging deliver push or SMS notifications about charging progress, including cost estimates based on consumption, with session data coordinated by the charging management platform (80) and associated to the user in the CRM backend (86).

Further, in an embodiment, the CRM backend (86) includes Live Support Chat and Maintenance Notifications features. Under Live Support Chat, the CRM backend (86) incorporates an integrated live support chat or guided conversational interface designed to assist users with issues such as authentication errors, technical difficulties, or charging interruptions. The CRM backend (86) also enables a live one-touch or voice-activated call to a human support executive through the SIU (30) or the mobile app, ensuring direct communication when needed. Additionally, the live one-touch guided assistant is available to provide instant help for general troubleshooting or FAQs, allowing users to receive immediate contextual guidance without manual navigation through menus.

Under Maintenance Notifications, users are notified proactively if the charger (20) or charging station (10) is undergoing maintenance. These notifications are delivered through the mobile app, the display of the charging station (10), or voice prompts via the SIU (30). The notifications include estimated repair times and, where applicable, suggestions for alternative nearby charging stations (10). The CRM backend (86), in coordination with the charging management platform (80), maintains and updates these alerts in real time, ensuring uninterrupted service transparency and enhanced user satisfaction.

In one of the embodiments, the system (100) implements a user feedback loop in which post-session feedback prompts users to rate their charging experience via voice through the SIU (30) or via touchscreen interfaces on the charger (20) or mobile app to improve service quality. The responses are captured and associated with the user's record in the CRM backend (86) and coordinated by the charging management platform (80) for reporting and service refinement. Further, loyalty rewards are provided frequent users with incentives such as discounts, priority access, or early notifications about new stations, with eligibility and redemptions managed through the CRM backend (86) and surfaced to the user via the mobile app and display of the charging station (10).

In one more alternative embodiment, the system (100) provides accessibility features in which voice assistants for disabled users ensure accessibility by offering voice commands through the SIU (30) for users with disabilities, enabling essential functions such as "start charging," "stop charging," and "check balance." Further, a visual and haptic feedback mechanisms are provided for users with hearing impairments, where visual signals (flashing lights) and haptic feedback (vibrations) convey critical status updates during operation, along with live agent support available through the mobile app or the charging management platform (80). Additionally, TTY (Text Telephone) compatibility ensures that users with speech or hearing disabilities can communicate effectively with customer support via text messages, creating a more inclusive and accessible experience for all users.

Further, the system (100) ensures data security & privacy through comprehensive safeguards, under encryption of personal data, all personal and biometric data, such as voiceprints, payment information, and authentication credentials, are encrypted to protect user privacy and ensure compliance with applicable data protection and cybersecurity standards. The encryption extends across data stored in the CRM backend (86), processed through the charging management platform (80), and transmitted via secure communication channels such as HTTPS or TLS/SSL. Under user consent, the system (100) provides clear consent options for data usage during the registration process, enabling users to understand how their information will be utilised. Users also have continuous access to privacy policies and data management settings through the mobile app and web portal (95), ensuring transparency, informed consent, and full compliance with data protection laws.

The system (100) ensures emergency scenarios & safety features for user protection and operational reliability. Under the emergency stop feature, users can immediately halt the charging session using a physical emergency stop button provided on the charger (20) or by issuing a voice command such as "Stop charging" through the SIU (30). Additionally, under safety alerts, the system (100) provides real-time safety reminders, including messages such as "Do not leave your vehicle unattended while charging" and "Ensure the charging connector is securely connected and placed back after charging," which are displayed on the charger (20) display, mobile app, or announced through the speaker (290) of the SIU (30) to maintain user awareness and safe operation during every charging session.

The system (100) provides NG-9-1-1/Emergency Calling functionality, wherein the voice interface, integrated within the SIU (30) connects users to emergency services. Users can initiate a 9-1-1 or other emergency call using simple voice commands such as "Call 911" or any predefined emergency number. This feature is designed for intuitive use, ensuring immediate access to emergency assistance through natural interaction. The system (100) employs advanced automatic location detection to provide real-time GPS-based geographic coordinates to dispatchers, enabling accurate and rapid emergency responses.

The SIU (30) is further configured with a duress detection function that allows a registered user to define and store a user-defined duress phrase within the system's authentication database. During any voice-based interaction, the voice processing module (VPM) (220) continuously monitors for the occurrence of a user-defined duress phrase, even while normal authentication commands are being processed. Examples include phrases such as "Midnight Light" or any preferred number or word combination. The user-defined duress phrase is language-independent, allowing users to select it in any language. Upon recognition of the duress phrase, the SIU (30) immediately signals the generative AI module (60) to execute an emergency-response protocol. The generative AI module (60) thereby triggers a silent alarm that is transmitted to designated contacts or monitoring centres without providing any audible or visual indication on the user interface. Simultaneously, the generative AI module (60) transmits real-time geographic location data of the charging station (10) and the authenticated user to authorised emergency-response services through secure communication channels. Throughout this process, the system (100) maintains normal interface operation to prevent alerting the potential threat actor. This duress-response design ensures user safety during coercive or emergency situations while preserving seamless system functionality and recording all such events within the CRM backend (86) for audit purposes.

In addition, an audio-visual notification confirms successful initiation of the emergency call. A visual alert appears on the display of the charger (20), indicating that the emergency request is being processed, while corresponding audio cues from the speaker (290) of the SIU (30) reassure the user that the system (100) is actively engaged in coordinating emergency response.

The system (100) implements advanced user identification and vehicle compatibility detection, wherein, in addition to the License Plate Recognition (LPR)/Automatic Number Plate Recognition (ANPR) camera (50), the facial recognition camera (240) integrated within the SIU (30) detects and verifies the user's arrival to enhance user experience and streamline the check-in process. Upon arrival, the system (100) utilizes facial recognition to identify the registered user, enabling seamless, hands-free registration through data verification with the CRM backend (86). Furthermore, the system (100) is equipped with the capability to distinguish between compatible electric vehicles (EVs) and non-charging vehicles, such as gasoline-powered or incompatible EVs. When a non-compatible vehicle is detected, the charger (20) displays and the SIU (30) announces a notification stating, "This vehicle is not compatible with the charging station (10). Please move to allow other users to access the charger," thereby preventing unauthorized use of the charging station (10) and ensuring its availability for genuine electric vehicle users.

The system (100) provides personal information and preferences management, enabling users to edit their personal details, such as name, phone number, and email, through their account settings accessible via the mobile app and web portal (95). Users can also update payment information, including credit/debit card details, stored wallets, and subscription models, directly through the mobile app, web interface, or the display of the charger (20). Furthermore, users can modify individual preferences, such as charging speed settings, notification preferences, and favourite stations, at any time. These updates are securely synchronised with the CRM backend (86) and charging management platform (80), ensuring real-time personalisation and greater flexibility and control over the user's overall charging experience.

Furthermore, the system (100) incorporates multi-user and multi-vehicle management, allowing users to register and manage multiple vehicles under a single account through the mobile app and web portal (95), or the charging management platform (80). Each registered vehicle can be linked to distinct authentication methods, such as voiceprint, facial recognition, or fingerprint, ensuring a personalised and secure experience for every user. This feature is particularly advantageous for families or shared vehicle ownership, as it supports family accounts where multiple users within the same household can maintain individual preferences, voiceprints, and vehicle profiles.

Each user within such an account can access specific functionalities, including charging preferences, location-based settings, and payment methods linked exclusively to their assigned vehicles. The system (100) ensures seamless switching between users and vehicles, improving operational convenience and minimising confusion during charging sessions. Additionally, the CRM backend (86) stores detailed records for each vehicle, such as charging history, energy consumption, usage statistics, and maintenance schedules-enabling users to efficiently manage and track their vehicles over time. Whether used for shared family vehicles or multiple individual EVs, this capability optimises the charging experience and enhances overall user control and efficiency.

In one of the embodiments, the system (100) supports Plug and Charge (PnC) functionality to streamline user authentication and charging initiation. When the charging connector is engaged with the vehicle, the system (100) automatically reads the identifier, such as a MAC identifier, transmitted from the vehicle's on-board PnC module. The identifier is then compared against a database of authorised identifiers stored securely in the CRM backend (86). If the identifier matches one of the registered vehicles, the system (100) automatically authenticates the connection and initiates the charging session through the charging management platform (80) without requiring any additional manual input, thereby enabling a fully automated and seamless charging experience for the user.

The system (100) is designed with a general mechanism for integration with the charging management platform (80), ensuring seamless communication and interoperability with various backend systems that adhere to industry-standard protocols. The charging management platform (80) supports integration with OCPP 1.6, OCPP 2.0, and OCPP 2.0.1, while remaining adaptable to future protocol updates to accommodate evolving industry requirements. This flexibility enables the charging stations (10) to interface with different management infrastructures for remote monitoring, billing, authentication, diagnostics, and over-the-air firmware updates.

Through this integration, the charging infrastructure remains scalable, future-proof, and compatible with diverse electric vehicle charging networks and operator systems. The communication between the charger (20) and the charging management platform (80) is established using structured data exchange in JSON (JavaScript Object Notation) format, allowing efficient, reliable, and standardised interaction across all connected modules and backend systems.

Therefore, the advantages of the present invention are to provide an intelligent, secure, and user-centric electric vehicle (EV) charging system (100) that integrates multimodal biometric authentication, adaptive security monitoring, and generative AI-based threat response within a unified framework. The system (100) enables seamless interoperability between the charger (20), SIU (30), and charging management platform (80), allowing for automated, contactless operation through voice, facial, or fingerprint recognition, as well as Plug and Charge (PnC) functionality. This integration significantly enhances user convenience by eliminating the need for manual authentication or setup while ensuring continuous protection through AI-driven cyber-physical monitoring. Additionally, the modular design allows the same hardware and software architecture to be deployed across diverse charging infrastructures—home, public, or fleet—thereby reducing manufacturing complexity, improving scalability, and lowering operational costs. The system's adaptability, combined with its self-learning AI and secure data management in the CRM backend (86), ensures long-term reliability, safety, and personalisation, resulting in an efficient and future-ready EV charging ecosystem.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

We claim:

1. An electric vehicle (EV) charging system comprising:
an electric vehicle charger configured to supply electrical energy to a connected electric vehicle through a charging cable;
a sensor interface unit (SIU) comprising at least one processor and a memory configured to:
receive user authentication data through one or more of voice, facial recognition, fingerprint, RFID/NFC tag, license plate, or mobile number based One-Time Password (OTP);
authenticate the user using a multi-modal biometric and contextual matching with a fallback sequence prioritizing voice authentication;
enable voice-based control of a charging and security operations;
a security monitoring module integrated within the sensor interface unit (SIU) and is connected to a power delivery unit, configured to:
monitor cable integrity and power connections for tampering or anomalies;
receive authentication state data from the sensor interface unit (SIU);
trigger alerts through visual, audio, and encrypted remote notifications upon detection of inconsistent user or cable states;
a generative AI module operatively integrated with the sensor interface unit (SIU) and communicating with the security monitoring module, configured to:
analyze authentication, sensor, and network data for physical and cyber threats;
synthesize adaptive security responses and personalized user feedback;
generate context-specific control signals to adjust charging session parameters or invoke duress detection;
a fleet management module operatively coupled to the generative Artificial Intelligence (AI) module configured to:
register fleets and assign hierarchical user roles, including super administrator, manager, and driver;
support temporary driver authentication using OTP;
associate each charging sessions to a corresponding vehicle and driver profile; and
a charging management platform configured to:
validate credentials from the sensor interface unit (SIU);

initiate and monitor charging sessions responsive to AI and security inputs;
record usage data, billing, and preferences;
wherein the system provides continuous charging operation, including duress detection, personalised user feedback, autonomous vehicle authentication, and AI-based cyber-physical threat response.

2. The electric vehicle (EV) charging system as claimed in claim 1, wherein the sensor interface unit (SIU) comprises:
a microphone array configured for directional audio capture with ambient noise suppression;
a voice processing module implementing natural-language-processing (NLP) and natural language understanding (NLU) executed by the processor of the sensor interface unit (SIU), the voice processing module being operable at ambient noise levels up to 85 decibels.

3. The electric vehicle (EV) charging system as claimed in claim 1, wherein the sensor interface unit (SIU) implements a multi-modal authentication method, the sensor interface unit (SIU) comprising:
a sequential fallback mechanism in which authentication is attempted first through voice recognition, followed by facial recognition, then fingerprint recognition, and finally by one-time password (OTP) verification;
a parallel biometric authentication requiring two or more biometric factors for high-security modes; and
configurable authentication levels determined by the charging management platform or a fleet policy based on at least one of transaction value, user preference, or security policy.

4. The electric vehicle (EV) charging system as claimed in claim 1, further comprising:
a proximity sensor configured to detect the presence of an approaching vehicle publishes a presence event to the SIU;
a license plate recognition (LPR) camera communicatively coupled to the SIU and configured to perform pre-authentication based on a registered vehicle identity; and
a lost user credentials retrieval module integrated within the SIU, operable when biometric authentication fails.

5. The electric vehicle (EV) charging system as claimed in claim 1, wherein the sensor interface unit (SIU) is configured for duress detection by recognising a user-defined duress phrase via a voice processing module and causing the generative AI module to:
trigger a silent alarm;
transmit a real-time geographic location to designated emergency response services; and
maintain normal operation of a user interface to avoid alerting the potential threat actor.

6. The electric vehicle (EV) charging system as claimed in claim 1, wherein the security monitoring module comprises:
electrical resistance measurement circuitry configured to detect cuts or breaches in the charging cable;
current-sensing circuitry configured to detect anomalies in power delivery from the power delivery unit; and
comparative logic circuitry configured to identify resistance deviations exceeding a predefined threshold value, indicative of tampering.

7. The electric vehicle (EV) charging system as claimed in claim 6, further comprising:
an input-power sensing circuitry configured to detect unauthorised disconnection events; and a state-logic controller configured to differentiate between authorised maintenance operations and tampering attempts using at least one maintenance authorisation token or a service mode command received from the charging management platform.

8. The electric vehicle (EV) charging system as claimed in claim 6, further comprising:

a fail-safe architecture comprising a primary and a secondary processing unit operating in redundancy;

a secured boot partition configured to retain core security functionalities during fault conditions; and automatic failover logic configured to monitor and continue event logging upon a processor failure.

9. The electric vehicle (EV) charging system as claimed in claim 6, further comprising:

a machine-learning module trained on historical tampering and fault datasets;

a dynamic-threshold adjustment engine that adapts resistance and current thresholds to environmental variables, including temperature and cable length; and a pattern recognition engine configured to reduce the occurrence of false positive security alerts.

10. The electric vehicle (EV) charging system as claimed in claim 6, further comprising:

a GPS-based location-reporting module configured to attach a geotag to tamper alerts;

integration interfaces for communication with law enforcement or third-party security databases according to a station policy; and video-capture trigger logic that commands a camera to record upon detection of tampering or unauthorised access.

11. The electric vehicle (EV) charging system as claimed in claim 1, wherein the fleet management module comprises:

a fleet registration module configured to assign unique fleet identifiers and establish hierarchical user roles, including the super administrator, the manager, and the driver;

a session tracking module configured to associate each charging session with a specific vehicle identifier and a driver identity under a fleet account.

12. The electric vehicle (EV) charging system as claimed in claim 11, wherein the super administrator is authorised to perform billing operations, fleet creation, and user management, the manager is authorised to assign drivers and register fleet vehicles, and the driver is restricted to initiating charging sessions and viewing session status information.

13. The electric vehicle (EV) charging system as claimed in claim 11, wherein the fleet management module includes a driver authentication submodule configured to:

issue time-limited OTP credentials to drivers;

enforce geofencing restrictions that limit charging session initiation to designated station locations; and generate automated alerts to managers upon driver profile changes or access attempts outside geofenced boundaries, the alerts being prioritised using a risk score provided by the generative AI module.

14. The electric vehicle (EV) charging system as claimed in claim 11, the fleet management module includes:

a fleet card management module configured to issue physical or virtual authentication cards linked to the fleet identifier;

an autonomous vehicle support module configured to authenticate a vehicle using an embedded RFID or NFC tag without driver input; and a charging schedule optimisation module utilising AI-generated utilization forecasts to allocate session times or power limits across the fleet via the charging management platform.

15. The electric vehicle (EV) charging system as claimed in claim 1, wherein the generative AI module comprises:

a continuous-monitoring engine configured to analyze user authentication attempts, network communication patterns, and physical sensor inputs from the security monitoring module, across multiple charging stations; and a credential-protection module configured to detect credential spoofing attempts and man-in-the-middle attacks affecting authentication or payment data, and to command the SIU to escalate authentication requirements.

16. The electric vehicle (EV) charging system as claimed in claim 15, wherein the generative AI module comprises:

a natural-language-processing (NLP) engine to interpret user voice inputs provided by the SIU;

a deep-learning model trained on historical cyberattack and intrusion data; and a reinforcement-learning engine configured to adjust threat-response policies over time based on observed outcomes.

17. The electric vehicle (EV) charging system as claimed in claim 15, the generative AI module comprising:

a user-behaviour profiling module configured to generate baseline interaction patterns for each registered user;

a risk-scoring engine configured to detect deviations from the baseline and publish a risk score to the SIU and the fleet management module through the charging management platform.

18. The electric vehicle (EV) charging system as claimed in claim 15, wherein the generative AI module includes an automated response module configured to:

implement escalation protocols ranging from user warnings to account lockouts;

initiate multi-factor authentication upon detection of suspicious login behaviour; and coordinate with the security monitoring module to perform integrated physical and cyber threat mitigation, including temporarily suspending the power delivery unit.

19. The electric vehicle (EV) charging system as claimed in claim 15, further comprising:

a deception framework comprising one or more honeypot charging ports configured to attract unauthorized users;

a decoy-data generation module configured to present non-operational session data to unauthorized users; and an automated incident-reporting module configured to notify designated security authorities with AI-generated summaries.

20. The electric vehicle (EV) charging system as claimed in claim 15, wherein the generative AI module further comprises:

a blockchain-integrated event logging module configured to append tamper and security events to an immutable audit trail;

a federated-learning framework configured to share threat intelligence across stations without transmitting user-identifying data; and a post-quantum cryptography configured to store credentials and audit logs using a quantum-resistant key-establishment or signature scheme.

* * * * *